United States Patent [19]
Schmersel et al.

[11] Patent Number: 6,055,302
[45] Date of Patent: Apr. 25, 2000

[54] SYSTEM AND METHOD FOR INCOMING AND OUTGOING INTERROGATIONS FOR STORE-AND-FORWARD SERVICES

[75] Inventors: Robert Johannes Bernardus Schmersel, Brunssum, Netherlands; Bo Arne Valdemar Aström, Hägersten, Sweden; Björn Arne Svennesson, Danderyd, Sweden; Gulamabbas Sumar, Kista, Sweden

[73] Assignee: Telefonaktiebolaget L M Ericsson (publ), Stockholm, Sweden

[21] Appl. No.: 08/724,769

[22] Filed: Oct. 3, 1996

[51] Int. Cl.[7] .................................................. H04M 3/42
[52] U.S. Cl. ........................ 379/207; 379/67.1; 379/88.22
[58] Field of Search ................................ 379/67, 88, 89, 379/207, 230, 67.1, 88.22, 88.25, 201

[56] References Cited

U.S. PATENT DOCUMENTS

| | | | |
|---|---|---|---|
| 5,572,583 | 11/1996 | Wheeler, Jr. et al. | 379/201 |
| 5,610,972 | 3/1997 | Emery et al. | 379/207 |
| 5,712,903 | 1/1998 | Bartholomew et al. | 379/89 |

OTHER PUBLICATIONS

Manvinder Chopra; Exploring Intelligent Peripheral Configurations; International Conference on Universal Personal Communications; Sep. 25, 1994–Oct. 1, 1994; San Diego; pp. 635–639.

PCT International Search Report dated Mar. 4, 1998.

*Primary Examiner*—Scott L. Weaver
*Attorney, Agent, or Firm*—Jenkens & Gilchrist, P.C.

[57] ABSTRACT

A system and method for conforming the service profiles for non-call-related store-and-forward messages to those applicable to calls in an Intelligent Network (IN) telecommunications system comprising several Intelligent Peripherals (IPs) connected to a Service Control Point (SCP) over a network. When an IP handling outgoing calls and messages receives an outgoing message or when an IP handling incoming calls is queried by a subscriber, the IP interrogates the SCP to determine whether any IN services such as restriction control and number translation have been requested, selected or imposed by or on either the sending or the receiving parties. The SCP acknowledges the interrogation and returns the generated results to the IP for further processing, optionally by retrieving and analyzing a service script corresponding to either the originating or the terminating party.

18 Claims, 7 Drawing Sheets

|     | SCEF | SMF | SDF | SCF | SSF | SRF | CCF |
|-----|------|-----|-----|-----|-----|-----|-----|
| SCEP | X   |     |     |     |     |     |     |
| SMP  |     | X   |     |     |     |     |     |
| SDP  |     |     | X   |     |     |     |     |
| SCP  |     |     | (X) | X   |     |     |     |
| IP   |     |     |     |     |     | X   |     |
| SSP  |     |     |     |     | X   | (X) | X   |
| SSCP |     |     | (X) | X   | X   | (X) | X   |
| SN   |     |     | (X) | X   | X   | (X) | X   |
| NAP  |     |     |     |     |     |     | X   |

SYSTEM AND METHOD FOR INCOMING AND OUTGOING INTERROGATIONS FOR STORE-AND-FORWARD SERVICES

CROSS REFERENCES TO RELATED APPLICATIONS

This U.S. patent application contains subject matter related to the following, co-pending U.S. patent applications: (1) SYSTEM AND METHOD FOR CONTROLLED MEDIA CONVERSION IN AN INTELLIGENT NETWORK, application Ser. No. 08/724,845 (Attorney Docket No. 27946-00156), Oct. 3, 1996, now U.S. Pat. No. 5,830,768 in the names of Bo Arne Valdemar ÅSTRÖM, Robert Johannes Bernardus SCHMERSEL, Gulamabbas SUMAR and Björn Arne SVENNESSON; (2) SYSTEM AND METHOD FOR SUBSCRIBER ACTIVITY SUPERVISION, application Ser. No. 08/723,620 (Attorney Docket No. 27946-00157), filed Oct. 3, 1996, in the names of Bo Arne Valdemar ÅSTRÖM, Robert Johannes Bernardus SCHMERSEL, Gulamabbas SUMAR and Björn Arne SVENNESSON; and (3) SYSTEM AND METHOD FOR IP-ACTIVATED CALL SETUP, application Ser. No. 08/725,431 (Attorney Docket No. 27946-00159), filed Oct. 3, 1996, now U.S. Pat. No. 6,005,345 in the names of Bo Arne Valdemar ÅSTRÖM, Robert Johannes Bernardus SCHMERSEL, Gulamabbas SUMAR and Björn Arne SVENNESSON. These co-pending patent applications and any other domestic or foreign Patent Applications deriving therefrom and the disclosure(s) contained therein are all hereby incorporated by reference herein.

The present Patent Application and all the related co-pending patent applications identified above have been or will be assigned to Telefonaktiebolaget LM Ericsson (publ).

DESCRIPTION

1. Technical Field of the Invention

The invention relates to the provision of supplementary telecommunications services, and more particularly, to a system and method for facilitating the extension of call-related services to non-call-related store-and-forward services.

2. Description of Related Art

Customer demand for customized telecommunications services has been growing ever more rapidly. Special subscriber features such as Call Waiting, Call Forwarding, Abbreviated Dialing, etc., are becoming increasingly important to individual subscribers for the added convenience they provide, as well as to telecommunications service providers as sources of additional revenue. Such services are generally provided by special programming in the software of the central office exchange serving a particular subscriber. That is, the local exchange switch software is separately programmed to provide special service features to the subscribers connected thereto. Often both the hardware and the software of an exchange must be upgraded in order to enable the provision of special subscriber functionality.

When a call involves an interconnection between two parties connected to different exchanges, it is completed via a so-called transit or tandem exchange which forms part of the network interconnecting individual central office switches to one another. In such cases, the transit exchange is totally transparent to the two parties of the call and simply provides a voice path between the two end offices. Any special service features invoked by either party has traditionally been provided by the end office to which that subscriber is connected, independently of the network connection between the two parties.

In most telecommunications systems providing Plain Old Telephone Service (POTS), the communications link between a calling party (A-Party) and the called party (B-Party) is under the control of the A-Party. Consequently, the communications link between the A-Party and the B-Party remains in place until the A-Party's telephone instrument is placed "on-hook" in which case the system breaks the communications link of the end offices of both parties and in any transit exchange's which have been used to link the end offices together. If the B-Party were to place his or her telephone instrument on-hook, it has little effect until after a period of the order of several minutes when a timer triggers the disconnection of the circuits between the calling and the called parties. In newer types of telecommunications services, such as the Integrated Services Digital Network (ISDN), B-Party disconnect is employed but the mechanisms for implementing it are considerably different from those of conventional POTS networks.

Providing special subscriber services within conventional telecommunications exchange requires an extensive upgrading of the software of each and every individual exchange which is to furnish such special services to its customers. Such upgrading of exchanges is often extremely expensive and virtually prohibitive from a cost-effectiveness standpoint with regard to the additional revenue provided by the additional subscriber services. This observation is even more true in small towns or rural areas where the demand for special subscriber services is relatively low and where existing exchanges have been in place for a considerable period of time and continue to adequately serve the basic telecommunications needs of a majority of the subscribers in that area.

The telecommunications business is facing increasing competitive pressures. The per-minute revenues of telecommunications operators everywhere has been steadily decreasing due to a number of factors. The deregulation of telecommunications services has increased the number of competitors in the business. Further, innovations like callback services and calling cards permit users to arbitrage differences in bilateral calling rates between country pairs. Also, cable television companies have now started offering telephone services over their cable networks. Finally, innovative software has now made high-quality full-duplex calls over the Internet feasible.

Improvements in technology have also reduced the cost of providing basic telephone service. The telecommunications companies can no longer justify the relatively high tariffs levied on the provision of basic telephone services. Improvements in technology have lowered the actual cost of delivering a telephone call to virtually nothing. In economic terms, basic telephone services can be viewed as zero marginal cost business. The advances that have increased the power to price performance ratio of desktop computers over the years have also boosted the reliability and efficiency of modern telephone exchanges.

The same situation is occurring on interexchange connections also. Due to the use of optical fibre, a substantial amount of capacity has been added to the telephone networks. Bandwidth no longer appears to be the scarce resource that it was just a few years ago, and, in fact has become a commodity that is frequently bought and sold in wholesale quantities.

Improvements in technology have also reduced or eliminated the effects of the geographic distance between a calling party and a called party as a significant factor in the cost of providing a telephone call. It has been argued that it costs no more in terms of network resources to call from Stockholm to Dallas (a distance of about 8,000 kilometers) than it does to call from Dallas to Austin (a distance of about 300 kilometers).

The explosive growth of the Internet has largely been due to the exploitation of the fact that its basic TCP/IP protocol permits e-mail messages to be sent and file transfers to be effected independent of the transmission distances involved.

In spite of the fact that the provision of long distance services does not cost much more than that of local basic telephone services, telecommunications operators continue to charge more for long distance telephone calls than for local calls. The increase in competition in the telecommunications industry is likely to make that situation increasingly unsustainable. Since long distance calls have traditionally been a significant source of the operating profits of the telecommunications companies, it has become increasingly obvious that the telecommunications companies need to find new sources of revenue.

One way in which telecommunications operators can increase revenues is by offering subscribers advanced services for which the subscribers would be willing to pay a premium for. As described earlier, in the network architectures of the past, the addition of new functionality to a network required that core exchange software be rewritten—an expensive and lengthy process that also carried the additional risk of introducing new bugs into the system. Furthermore, each exchange in the network has to be updated with the new software which further increased the cost of introducing new services. Telecommunications operators are no longer willing to tolerate such a state of affairs. There are great business opportunities for a telecommunications equipment manufacturer who can bring a product to the market first.

Telecommunications operators have expressed a need for faster and less expensive techniques for the introduction of new services into their telecommunications network. Further, they have desired that the impact of the new functionality be limited to one or a few exchanges only. It has also been found desirable for service-administration tasks such as the installation or modification of services, the addition of customer-specific data, etc., be capable of being handled from a central management facility.

It has also been desired that the design and implementation of the new services be done by the telecommunications operators rather than the equipment manufacturer. This would allow telecommunications operators to quickly react to perceived market needs and serve their customers more effectively and efficiently. It has also been found desirable to incorporate greater intelligence in the exchange software to permit various services to interact with subscribers. In this manner, the telephone instrument can become an advanced interface to the telecommunications network.

The Intelligent Network (IN) has been proposed as a solution to address the above requirements. The IN technology is designed to allow a telecommunications operator to design its own set of unique services or to adapt existing services to specific customer requirements. Further, the IN architecture permits the impact of installation of new services to be limited to a few control nodes.

Another design feature of the IN architecture is its centralized administration of services. This improves the response time and decreases the human resource overhead required to run the network. Furthermore, the IN architecture permits customer control of some customer-specific data.

For example, some telecommunications operators offer "personal number" services. The personal number service involves giving each subscriber a specific telephone number, usually one prefixed with an "area code" of 500. The design philosophy behind the personal number service is to supplant the plethora of contact numbers for each subscriber with just one phone number. Thus, when someone dials a subscriber's personal number, the exchange switch will query a central database and obtain a list of all of the telephone numbers where the subscriber might possibly be reached. The switch will then ring each of those numbers in a predetermined order until the call gets answered.

In one variant of this service, a subscriber may be provided the ability to dynamically update the contact number database from any telephone instrument. Such customer control can permit a subscriber to add the number of a hotel or other location where he or she may be temporarily located.

The design philosophy behind the IN architecture is to reduce the time to market for the provision of new services, to lower development and administration costs, and to enhance profits deriving from the provision of premium services. The classic example of an IN service is the use of a single dialed number (the B-number) by customers spanning a large geographic area that is redirected to one of a plurality of local service centers. Thus, a pizza franchise can advertise a single telephone number for ordering pizzas. Whenever a customer dials the advertised number, the IN service can direct the call to the nearest franchisee based upon the number of the dialing subscriber (the A-number).

A Brief History of IN

The Intelligent Network concept originated in the United States. Originally, the intent was to provide a central database for translating a single dialed number into a different terminating number. One of the earliest applications of IN services was to provide toll free calling ("Freephone").

Toll free numbers do not directly correspond to a physical telephone line, but need to be translated into an actual termination number. The translation may be dependent upon the location of the caller and upon the time of day.

A new signaling system called Signaling System No. 7 (SS7) was developed to allow high-speed communications between telephone exchanges before and during call setup. The SS7 protocol allowed for the first time, the fast database lookups needed for the implementation of toll-free calling. After the development of the SS7 technology, it became possible to exchange data across a telephone network virtually instantaneously. This was the genesis of the Intelligent Network.

The next step in the revolution of the IN was to move from static databases to dynamic ones that permitted customer control of customer-specific data. Additional interactivity came to be permitted when subscribers could control the progress of the call by keypad interaction from the subscriber's instrument. Such interactive IN is referred to in the U.S. as the Advanced Intelligent Network (AIN).

Present development and interest in the IN architecture is being driven by a few large-scale applications. Two such applications are the Universal Personal Number (UPN) Service and Virtual Private Network (VPN) Service. In the UPN service, a unique number is assigned to each individual rather than to a telephone instrument. The UPN number can be used to reach a subscriber irrespective of his or her location or type of network (whether fixed or mobile).

The VPN service allows a private network to be constructed using public network resources. Thus, a corporation could have a corporate telephone network that permits all of its employees to communicate with each other without investing in the hardware or software needed for providing a physical private network. By implementing a VPN service using the public network, a corporate customer can also avoid the costs of maintaining a physical network.

Inadequacies of Present IN Systems

The use of the Intelligent Network (IN) architecture has been advocated as a solution for speeding up the incorporation and roll out of new network capabilities and network services. However, the presently articulated standards for implementing IN concepts suffer from a number of shortcomings.

Subscribers in presently-envisaged IN implementations, may have access to a variety of customized services and features. For example, subscribers may be permitted to designate frequently called numbers using shorter dial codes, a feature often referred to as "short numbering", "speed dialing" or "abbreviated dialing" service. Current standards also permit subscribers to restrict outgoing calls to specific numbers or to ranges of specific numbers (such as area codes, country codes, 900 numbers, etc.), a feature referred to as "call barring".

Subscribers may also place restrictions on incoming calls such as requesting automatic rejection of all calls from one or more specific numbers or of all calls belonging to a specific class such as calls having their caller identification masked, a feature referred to as "anonymous call rejection". Subscribers might also be able to have their calls forwarded from land line to mobile terminal, from one mobile terminal to another, etc.

Subscribers in an IN system may also receive incoming non-call-related messages such as voice mail, electronic mail (e-mail), messages in Short Message Service (SMS) format, etc. Present IN standards have generally not articulated or suggested techniques or procedures for restricting the generating, storage, retransmission or receipt of non-call-related store-and-forward services in such a way as to conform these features and restrictions with those placed on incoming or outgoing calls from or to a subscriber.

Thus if three subscribers, A, B and C, are members of a Virtual Private Network, in which calls made from A to B after close of business hours on each working day are automatically routed to C, then it would be advantageous to have e-mail messages directed from A to B also to be redirected automatically after office hours to C. Similarly, if some users of a company-wide telecommunications network are restricted from calling outside the telephones of their division, it would be useful if similar restrictions were placed on voice mail and facsimile mail generated by those users also.

Service providers have found that subscribers would like their preferences, priorities and rights relating to incoming and outgoing calls to also apply to non-call-related services. Since subscriber preferences are stored as profiles or service scripts in the Service Control Function (SCF) of an Intelligent Network (IN), it will be useful if IPs (Intelligent Peripherals) in an IN that handle non-call-related store-and-forward messaging services were also able to access the service scripts stored in the SCP.

If a telecommunications service provider were able to provide services, features and restrictions for non-call-related messages for a subscriber that conformed to the services, features and restrictions that are available or applicable to calls made by or to a subscriber, then the service provider would be able to provide enhanced value to the subscriber and thus reap additional revenues.

Thus, it would be highly desirable to be able to provide some means within an Intelligent Network system to provide the same levels of implementational assistance and operational functionality for non-call-related store-and-forward services such as voice mail, electronic mail (e-mail), SMS messages, facsimile mail, etc. as that permitted for call-related services such as the establishment of subscriber-specific Virtual Private Networks (VPNs), abbreviated dialing codes (short numbering), incoming and outgoing call restrictions (call barring, anonymous call rejection), call forwarding, etc. This in turn requires a system and method for querying a system controller such as Service Control Function (SCF) in an IN to obtain subscriber-specific data that would ordinarily be available only for call-related process invocations.

SUMMARY OF THE INVENTION

Therefore it is a primary object of the present invention to facilitate the extension of call-related services to non-call-related store-and-forward services. It is a further object of the present invention to generalize the ability to restrict the generation, storage, retransmission or delivery of one or more message types without regard to the message type by reference to service profiles or preferences. It is also an object of the present invention to permit different types of messages received at different nodes to be stored, retransmitted or delivered in a distributed manner, and based upon subscriber-specified restrictions and preferences.

It is an additional object of the present invention to provide integrated messaging services that are implemented on different physical nodes. The present invention provides such a networked solution based on the IN architecture by defining a protocol to implement integrated non-call-related store-and-forward messaging solutions.

The present invention aims to provide a solution for conforming the service profiles for non-call-related store-and-forward messages to those applicable to calls in an IN system so that a subscriber can choose to have some or all of their incoming and outgoing messages treated in the same manner as their incoming and outgoing calls.

One embodiment of the present invention has been implemented in an IN (Intelligent Network) telecommunications system comprising a plurality of IPs (Intelligent Peripherals) connected to an SCP (Service Control Point) over a network. The plurality of IPs are further connected to each other over a distinct telecommunications backbone.

In one embodiment of the present invention, a message is received by an incoming IP that in turn interrogates the SCP to determine whether any IN services such as restriction control and number translation have been requested, selected or ordered by either the sending party or the receiving party. The SCP responds by acknowledging the interrogation and returns the generated results to IP.

In an alternative embodiment of the present invention, when an IP handling outgoing calls and messages sends an outgoing message, the IP interrogates the SCP to determine whether any IN services such as restriction control and number translation have been requested, selected or ordered by either the sending party or the receiving party. The SCP responds by acknowledging the interrogation and returns the generated results to the IP for further processing optionally by retrieving and analyzing a service script corresponding to either the originating or the terminating parties.

An IN subscriber may subscribe to several non-call-related store-and-forward services, such as voice mail, e-mail, SMS, facsimile mail, etc., and may wish to have the generation, storage, retransmission and delivery of these various message types to be coordinated. The various messages relating to different services subscribed to are usually stored at different physical or logical IPs in an IN network.

The present invention does this by introducing two new procedures to INAP: the "Incoming Delivery Interrogation" command which enables an IP that receives an incoming message to query the SCF about the rights and restrictions applicable to calls made to or by the recipient of the message; and the "Outgoing Delivery Interrogation" command which enables an IP that sends an outgoing message to query the SCF about the rights and restrictions applicable to calls made to or by the sender of the message.

BRIEF DESCRIPTION OF THE DRAWINGS

A more complete understanding of the method and system of the present invention may be obtained by reference of the detailed description of the preferred embodiments that follow, taken in conjunction with the accompanying drawings, wherein.

DESCRIPTION OF THE PREFERRED EMBODIMENT

The present invention provides a solution to a set of problems concerning the extension of call-related services such as Cellular Virtual Private Network (CVPN) numbering, short numbering (abbreviated dialing), call barring, call forwarding, etc., to non-call-related store-and-forward messaging services such as voice mail, facsimile mail, electronic mail (e-mail), SMS messages, etc. The extensions to the IN concept disclosed and described in this application can also be used in other telecommunications contexts and can also facilitate the provision of related supplementary subscriber services.

Intelligent Network (IN) Architecture

An Intelligent Network is a telecommunications network architecture that provides flexibility for facilitating the introduction of new capabilities and services into a network such as the Public Switched Telecommunications Network (PSTN) or a Public Land Mobile Network (PLMN). Examples of such new capabilities and services include toll free calling ("Free Phone"), credit card services and Virtual Private Networks (VPN).

IN embodies the dreams of the unbundled network of the future in which freedom is given to service providers and users to personalize the network services, independently of access, switch term technology and network providers. An international consensus view on IN is described in the ITU-TS Recommendation Q.1200.

Figure 1:
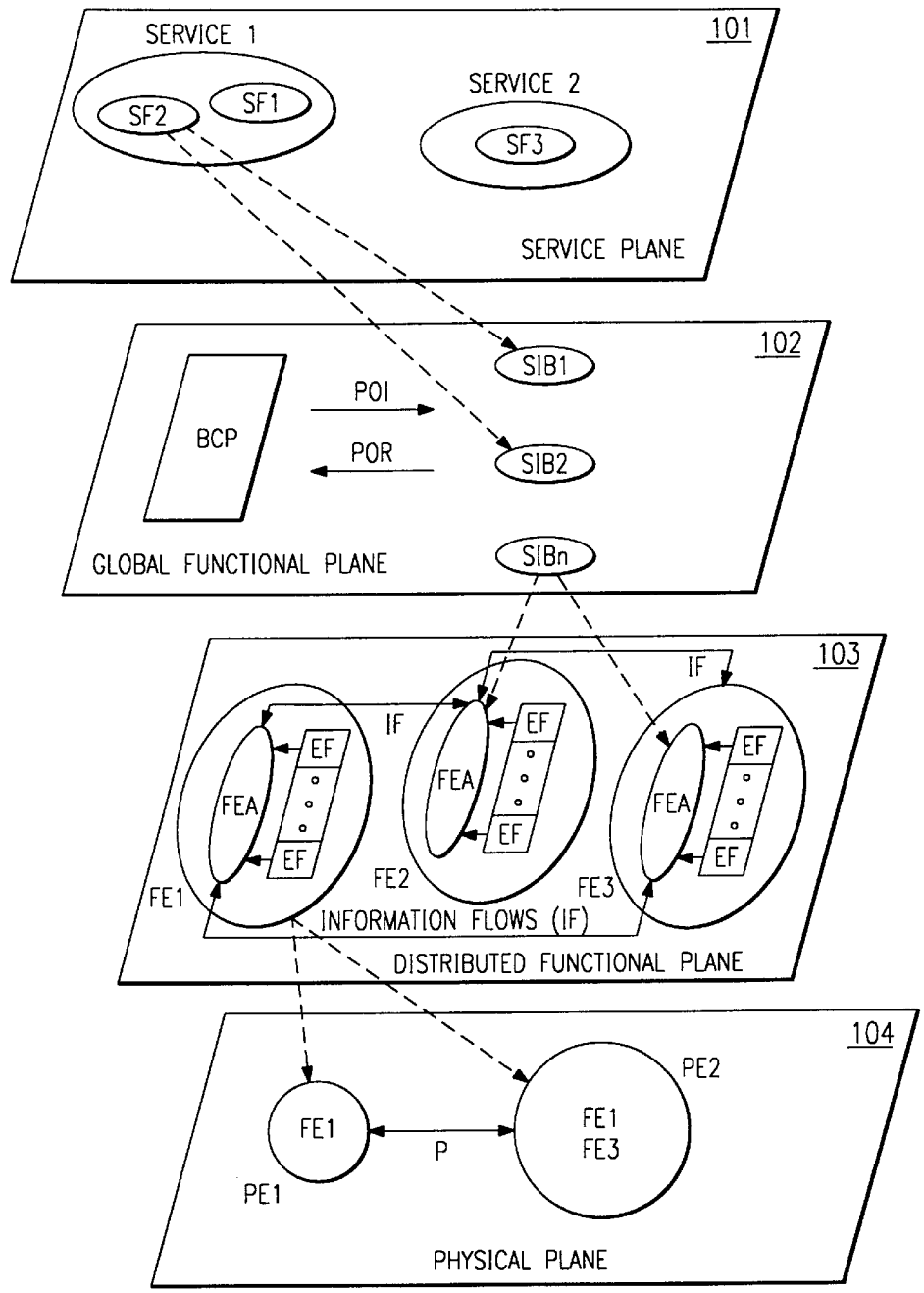
FIG. 1 is an illustrative diagram showing the standard Intelligent Network (IN) Conceptual Model.

The details of the IN architecture have been specified in the International Telecommunications Union (ITU) Recommendation I.312/Q.1201 which also contains a verbal explanation of the IN Conceptual Model (INCM) shown in FIG. 1. The ITU's IN Conceptual Model analyzes and systematizes the various tasks and processes associated with call handling and the provision of services into four planes: a Service Plane 101, a Global Function Plane 102, a Distributed Function Plane 103, and a Physical Plane 104.

So far, IN has been concentrated around a group of services referred to hereafter as Number Services, for example, toll free calling ("Free Phone"), credit card calling, personal number services, televoting, etc. A key characteristic of all these services is that they provide service to numbers that are unbundled from the access ports in the access nodes. Any node in the telecommunications network can be made a service node by the addition of a Service Switching Function (SSF) and/or Special Resource Function (SRF), both under control from a Service Control Function (SCF) via a service-independent protocol interface. The SCF is supported by a Service Data Function (SDF), which may be physically unbundled from the node.

The main building blocks of IN are the SSF, the SCF, the SDF and the SRF. The SRF is also referred to hereafter as the logical Intelligent Peripheral (logical IP). Each of these building blocks is a separate logical entity which may, but need not, be physically integrated with the other entities of the telephone network, logical or otherwise. The physical and logical entities are referred to interchangeably as one in the following description of the preferred embodiment.

The IN architecture divides the basic call process into discrete strictly-defined stages that gives telecommunications service providers and subscribers the ability to manipulate the call process. The components of a simple Intelligent Network 200 has been shown in FIG. 2. The standard architecture of the Intelligent Network has defined various components of the IN as well as the interfaces between the individual components.

When a call is made to an IN service, the call is first routed to a special node in the network that is called the Service Switching Point (SSP). If the SSP recognizes an incoming call as an IN call, then all further processing of the call is suspended while the SSP informs the Service Control Point (SCP), another node in the IN system, that an IN call has been received.

The SCP provides the "intelligence" in the "Intelligent Network." The SCP controls everything that happens to an IN call and makes all the call processing decisions. When the SCP decides upon the appropriate action that is to be performed on the call, the SCP instructs the SSP to carry out the necessary action.

The Service Control Function (SCF) contains the logic of an IN service and bears the complete responsibility for making decisions related to a call invoking that service. This service logic may run on any telecommunications platform (e.g., Ericsson's AXE platform or UNIX). The node (i.e., the physical hardware and the software) that contains the SCF is called the Service Control Point (SCP) 201.

The data needed for each service (e.g., the list of subscriber telephone numbers) is provided by the Service Data Function (SDF). In one implementation of the IN architecture, the data needed for the services is stored in the SCF itself. Formally, the function of storing the service-related data is allocated to the SDF which provides the data upon demand to the SCF. In a typical IN implementation, the SDF can be UNIX's machine running a commercially-available database program such as Sybase. The physical node that contains the SDF is referred to as the Service Data Point (SDP) 202.

The normal call handling and supervisory functions of an exchange are performed by the Call Control Function (CCF). While the CCF is not formally part of the standard IN architecture, the CCF provides the IN with information about calls and also executes orders that have been received by the SSF.

The Service Switching Function (SSF) interprets the instructions sent by the SCF and passes the commands to be executed to the CCF. The SSF also receives call event data (e.g., the onhook/offhook status of a subscriber or a subscriber line being busy) from the CCF and passes the data to the SCF. The physical node (i.e., the exchange hardware and software) that contains the SSF is referred to as the Service Switching Point (SSP) 204 and 205.

The Specialized Resource Function (SRF) provides certain resources for use in IN services, e.g., DTMF (Dual Tone Multiple Frequency) digit reception, announcements and speech recognition. In the ITU IN recommendations, the SRF communicates directly with the SCF. In another implementation of the IN, the SRF functionality may be co-located with the SSF. In this case the SRF does not communicate directly with the SCF, but via the SSF. The SRF is not shown in FIG. 2.

The Service Management Function (SMF) 207 administers the maintenance of IN services, e.g., the addition or removal of data or the installation or the revision of services. The Service Creation Environment Function (SCEF) 207 allows an IN service to be developed, tested and input to the SMF. In one implementation of the IN, the SMF and the SCEF are combined into one and termed the Service Management Application System (SMAS). The SMAS application is part of the TMOS family and runs under the UNIX operating system. It permits services to be designed using a graphical interface and provides convenient forms for the entry of service data.

Figure 2:
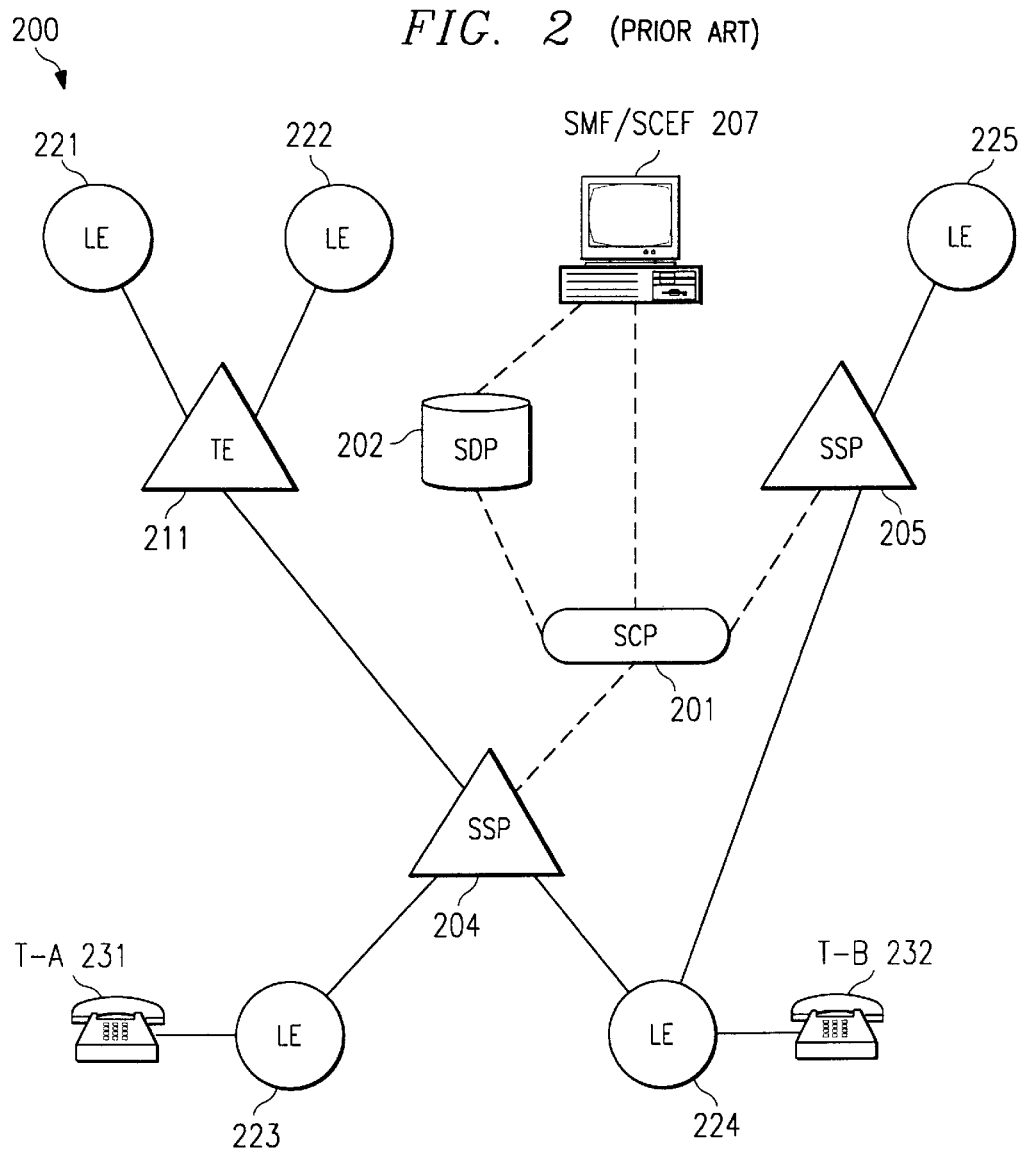
FIG. 2 shows the components of an exemplary simple Intelligent Network.

FIG. 2 shows an exemplary SCP 201 connected to an SDP 202 and SSPs 204 and 205. The SCP is also connected to an SMF/SCEF 207. All of the links running to and from the SCP 201 are shown as dashed lines in FIG. 2 to indicate that they are not voice links. The SDP 202 is also connected by a non-voice link to the SMF/SCEF 207. The SSP 204 is connected to two local exchanges (LEs) 223 and 224 as well as to a transit exchange (TE) 211. The transit exchange 211 in turn is connected to two other local exchanges 221 and 222. The SSP 205 is connected to local exchange 225. The local exchanges 223 and 224 are shown in FIG. 2 to be connected to an exemplary originating subscriber T-A 231 as well as to an exemplary terminating subscriber T-B 232.

If each of the logical building blocks of the IN are also physical entities, in the notation described earlier, the corresponding physical nodes are called the Service Switching Point (SSP), the Service Control Point (SCP), the Service Data Point (SDP), and the physical Intelligent Peripheral (IP). As stated earlier, in the discussion that follows, the term IP is used to generally refer to both a logical IP as well as a physical IP.

The user agent is identified in the SCF by the calling or the called party number, and invoked when an armed trigger point in the serving node is hit. Signaling data and call state data can be manipulated by the user agent. The SRFs are capable of in-band communication with the users or with each other to overcome limitations in the current signaling systems.

Current IN standards assume that the visited location and the home location of a subscriber are collocated but possibly unbundled from the access node and the service node. Although the separation of the access node and the service node functions reduces service introduction costs, it results in potentially unwanted interactions between access port services and number-based services. An enhancement of the access node to a service node is therefore required to provide flexibility in service design.

An alternative would be to add two remotely changeable personal telecommunications categories to the access nodes—one providing an unconditional hot-line connection to the service node for originating calls, and the other giving an unconditional call forwarding to the service node for terminating calls. It appears necessary in the longer term to separate the visited and home location functions as in cellular networks if costs are to be reduced and capacity is to be improved.

Figure 3:
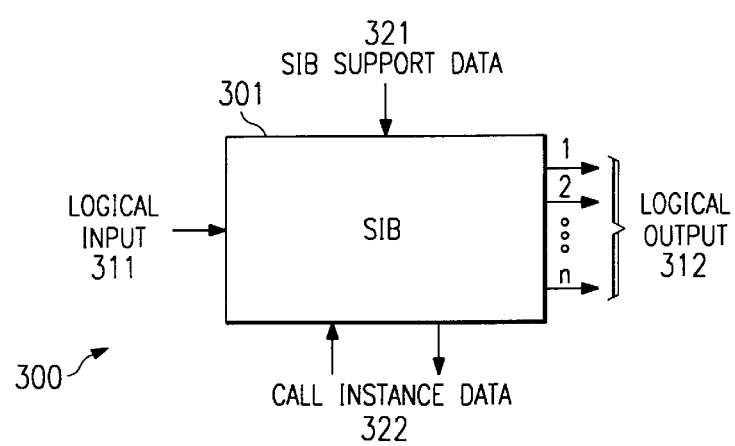
FIG. 3 shows the structure of a Service Independent Building Block (SIB)

One of the unique characteristic of IN is that services are implemented on the IN service platform based on its service independent building blocks (SIBs), and not directly in the network nodes. The SIBs are part of the SCP. FIG. 3 shows the structure of a SIB. Each SIB 301 is an elementary logical element in a service logic that hides the implementation from the programmer. When existing SIBs cannot meet a new requirement, new SIBs are defined.

In IN products, the SIBs 301 perform functions such as analysis of signaling information, control of connection topology, interaction with the user, reading and writing of data, collection and output of call data, etc. Other SIBs are pure language elements such as jump, go to subroutine, loop, handover, etc. Each SIB 301 is available in the service platform. Service Logic Profiles (SLPs) are built by SIBs 301 and refer to by their names. Service logic can be designed using a Service Creation Environment Function (SCEF). The SIBs 301 are made available to the SCEF through a system-independent Application Programming Interface (API). As illustrated, a logical input is applied to the SIB, and the SIB 301 generates a plurality of logical outputs 312. The SIB also receives SIB support data 321 and both receives and outputs call instance data 322.

Figures 4, 5:
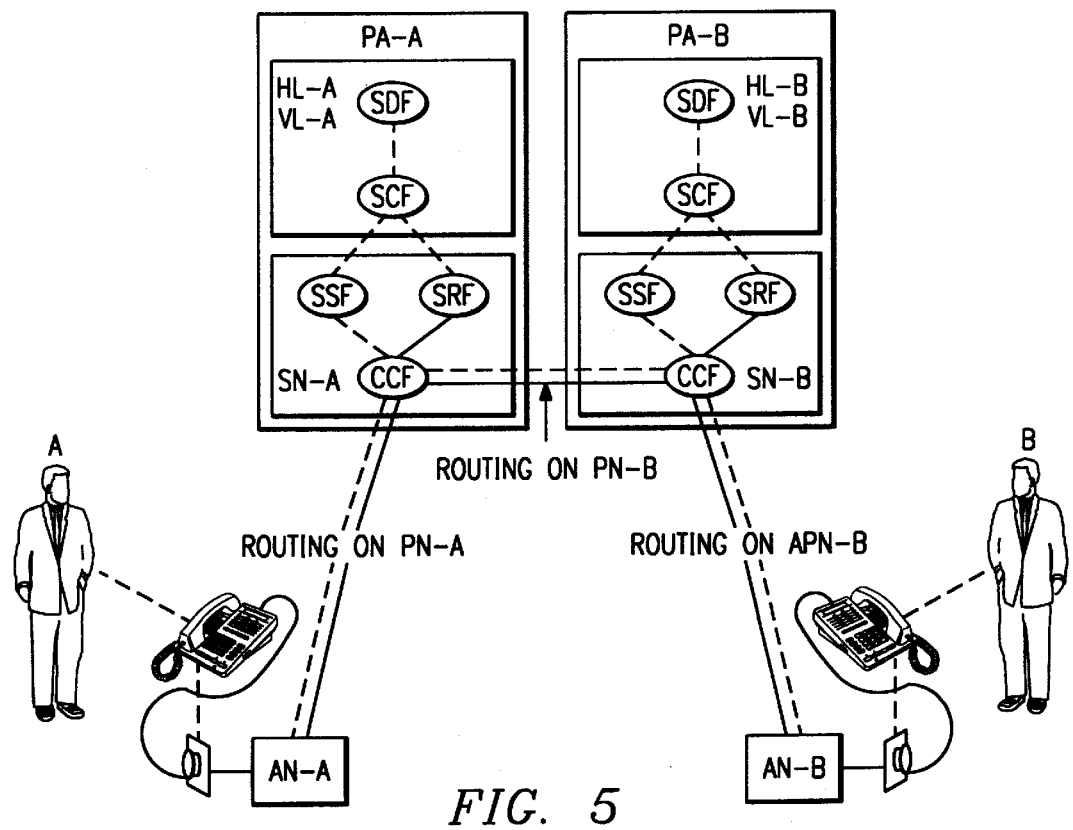
FIG. 4 shows the mapping of the various IN functional entities into physical units.
FIG. 5 shows an example of an IN implementation with service nodes at the transit level.

The mapping of the various IN functional entities into physical units or entities is shown in FIG. 4 where the suffix "F" stands for the various functional entities and the suffix "P" stands for physical entities. In FIG. 4, the acronym SMF refers to the Service Management Function and the acronym CCF refers to the Call Control Function.

An example of an IN implementation with service nodes at the transit level is illustrated in FIG. 5. The service nodes shown in FIG. 5 can be reached from any access node such as a local switch in PSTN or ISDN or an MSC in a Public Land Mobile Network (PLMN) system. The service nodes can serve both personal telephony as well as other number-based services. User identities and authentication information may be transferred in-band to the SRF or embedded in calling- and called-party number fields in the signaling systems.

The personal agent has components in the Call Control Function, CCF (i.e., the trigger point data), the Service Control Function, SCF (i.e., the service logic), and in the Service Data Function, SDF (i.e., the service data). The IN platform components illustrated in FIG. 5 can be either integrated into the access nodes or implemented in separate service nodes.

The role of the Service Switching Function (SSF) is to recognize that a call is invoking an IN service, and then to communicate with the SCF to receive instructions about how to handle the call. The SCF is where the intelligence of the IN resides as it contains the logic required to execute various services. The SDF is a database system that provides the data storage capacity needed for the data intensive supplementary services. The IP is the network element that provides resources for user interaction such as voice announcements and dialogue, dual tone multi-frequency reception (DTMF) and voice recognition.

The IN Application Programming Interface (API)

Figure 6:
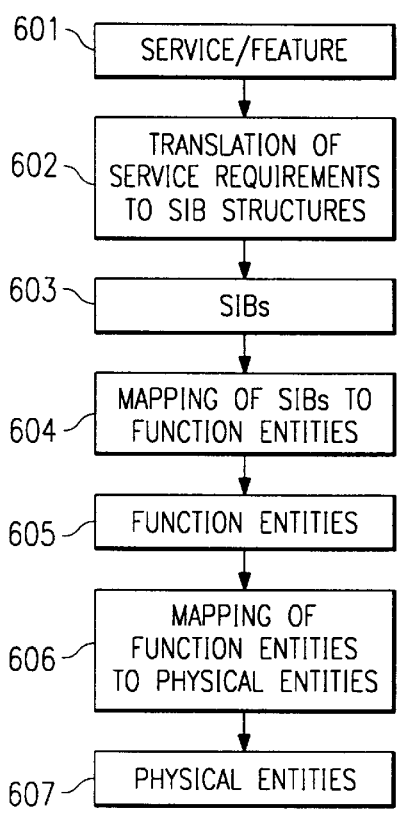
FIG. 6 shows the preferred methodology for implementing various services in the IN Conceptual Model.

The ITU's IN Conceptual Model shown in FIG. 1 also defines the methodology for implementing various services. This is shown in FIG. 6. In order to implement a service or feature 601, the service requirements are first translated to SIB structures at 602. The resulting SIBs 603 are mapped at 604 to various Functional Entities 605. The Functional Entities 605 in turn are mapped at 606 to one or more Physical Entities 607.

It should be noted that unlike the practice with all non-IN standards, the service requirements in IN are not directly translated into network functionality. Instead, the service requirements are translated into service platform elements (i.e., SIBs) which in turn are implemented according to the IN three-stage model to become reusable capabilities and protocol elements in the telecommunications network.

There are at least two possible approaches toward implementing the Application Program Interface (API) that conform to the ITU's IN Conceptual Model shown in FIG. 1. One approach would be to split the service logic into two parts: a fixed logic part and a flexible logic part. The SIBs are then linked to form decision graphs that are called as subroutines by the fixed logic. The fixed logic can be expressed in a standard programming language such as C or C++, etc., and compiled and loaded into a standard execution environment. The flexible logic part, in contrast, consists only of exchangeable data.

The second approach would be to define a service API that gives full control over all aspects of the logic by combining SIBs with each other to achieve the desired function. Each SIB can be linked to any other SIB in this approach. Some SIBs perform a telecommunications function while others are only linking elements in the logic. All logic is expressed as data that describes which SIBs are to be used, how they are linked, and what data each SIB is to use to perform its function. All implementation details are thus hidden from the service programmer. This is the principal approach taken in Ericsson's IN products.

Figure 7A:
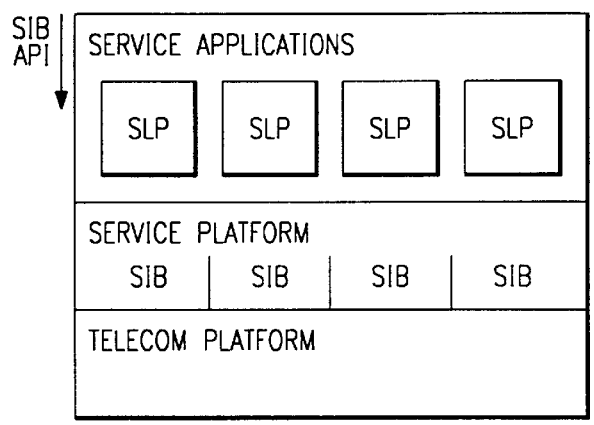
FIG. 7 illustrates two approaches towards implementing an API.
Figure 7B:
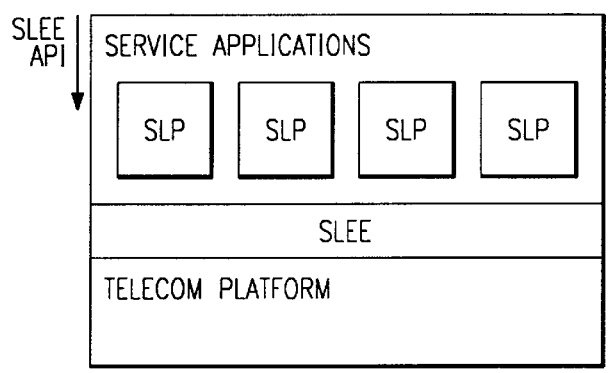

The two approaches toward implementing the API are illustrated in FIG. 7. The SIB-platform approach is shown in FIG. 7A, and the Service Logic Execution Environment (SLEE) approach is shown in FIG. 7B. The SIB approach of FIG. 7A expresses all service logic as a combination of elementary SIB functions that are available in the service platform to form flexible service profiles (FSPs). The SLEE approach shown in FIG. 7B considers the SIBs as subroutines to the fixed logic expressed in a programming language such as C, C++, Service Logic Programs (SLPs), etc. The compiled code uses telecommunications platform primitives, such as INAP (Intelligent Network Application Part) operations and database primitives.

Figure 8:
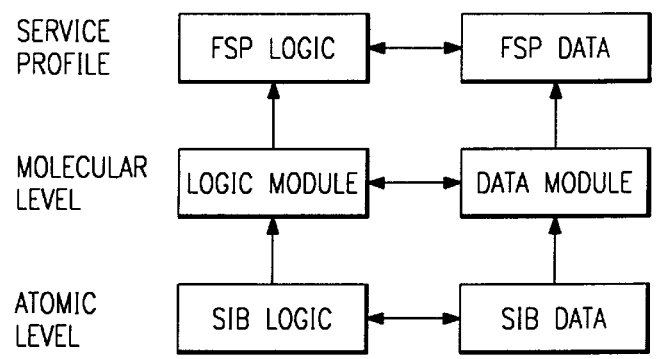
FIG. 8 shows one technique for defining personal agents using Service Logic Programs (SLPs)

When the same data representation is used for all logic and data, personal agents can be defined by means of Flexible Service Profiles (FSPs), as shown in FIG. 8. This arrangement offers a number of advantages, for example, permitting different logic elements to be loaded and activated without disrupting service, and in case of a fault in a personal agent, limiting the affected zone to only calls activating the faulty function.

Feature interaction has been a major obstacle in the development of IN systems. This problem arises from the fact that each feature is normally dependent on other features. There is a need to resolve such interactions, but no solution has yet been agreed on. It has been found in practice that existing feature implementations are often affected and many have to be redesigned or completely blocked when new features are introduced. It should be noted that this problem can be approached from two viewpoints: the network-centric view and the user-centric view of IN systems.

The traditional network-centric view sees IN as a complement to other technologies in adding supplementary services to an existing repertoire. Feature interaction has and continues to be the obstacle that prevents this view from being a realistic alternative. Each new supplementary service is composed of a fixed service logic part, and potentially of a flexible logic part. Personalization is thus limited to what can be achieved by combining a number of pre-defined supplementary services or features with each other. The addition of a new service may require long and costly development, not different from the pre-IN experiences in PSTN, PLMN and ISDN. The central issue in this viewpoint is not the design of a new feature, but on the task of integrating a new feature with other preexisting features.

In contrast, the user-centric view of IN focuses on the users rather than on the features. In principle, the needs of individual users are assumed to be unique, with the service provider being in full control of all service logic. The FSP approach is applied, and the result is that a range of unique service profiles can then be created by reusing SIBs rather than reusing features. This means that feature interaction ceases to be a problem, since no individual features are implemented. The interaction between the SIBs constitutes the service logic in this approach.

Interaction between service profiles in this approach is resolved through open signaling interfaces according to the half-call model. Before complete control can be provided from the step-wise developed IN platforms in an economically feasible way, it has been found necessary to use some of the existing supplementary services. It should be borne in mind that this is a shortcut that can result in interaction problems requiring enhancement of the IN platform in the future.

The principal goal in the user-centric view is to make the SIBs standardized so as to achieve both service-independence and system-independence and technology-independence. When this is achieved, a SIB-based service profile can be executed on any compatible platform, whether it is a switch processor, a stand-alone personal computer, or work-station. The old paradigm, giving the same features to all subscribers, is replaced by feature transparency for each individual subscriber, irrespective of access.

IN Signaling

The Intelligent Network Application Part (INAP) Protocol is used for signaling in IN systems. The INAP signaling protocol has been standardized by both the European Telecommunications Standards Institute (ETSI) and the International Telecommunications Union (ITU), and includes the CCITT Signaling System No. 7 (CCS7) which is one, but not the only network protocol that may be used to support INAP.

One of the shortcomings of the core INAP as it is specified today (i.e., the IN CS-1 standard), is that the communication possibilities between the SCF and the IPs are restricted to speech only. Other media such as e-mail, facsimile, data, etc. are currently not supported by the CS-1 standard. Thus, non-call-related services are not included in the present CS-1 standard.

The Networked IP (NIP) implementation, of which the present invention is a part, can be characterized as an extension to the INAP to include the handling and processing of non-voice media and the provision of non-call-related communication between the SCF and the IPs. NIP allows the SCF to be in total control of all store-and-forward (i.e. messaging) services such as voice mail, e-mail, SMS messages, etc. The protocol used for the NIP implementation is referred to hereafter as NIP-INAP. The NIP-INAP is an Ericsson-specific extension to the IN CS-1 standard.

Networked IPs

Figure 9:
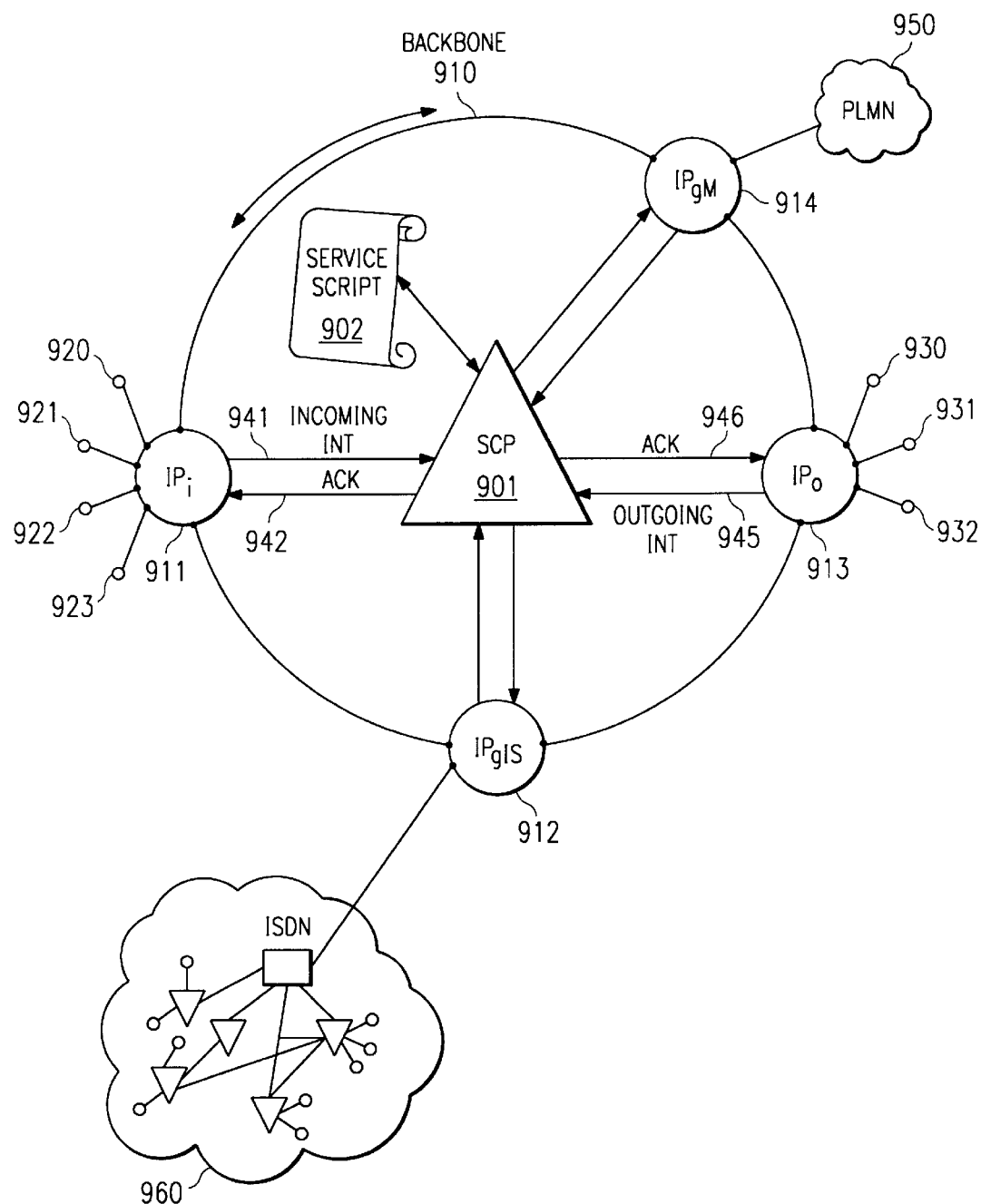
FIG. 9 shows one embodiment of the Networked IP (NIP) system and method of the present invention.

FIG. 9 shows the Networked IP (NIP) system of an embodiment of present invention. A Networked IP system comprises an SCP 901 that can communicate with a plurality of Intelligent Peripherals (IPs) 911–914. Each of these logical IPs are SRFs in IN terminology, as noted earlier. For illustrative simplicity, only four IPs are shown in FIG. 9: an IP handling incoming calls and non-call messages, $IP_i$ 911; an IP handling outgoing calls and non-call messages, $IP_o$ 913, an IP connected to an ISDN system 960, $IP_{gis}$ IS 912, and a gateway IP connected to a PLMN system 950 $IP_{gm}$ 914.

It should be emphasized that the functionally specialized IPs depicted in this illustration do not correspond to their physical implementations, which may be quite different. The various IPs 911–914 communicate amongst each other over a communications backbone 910 using any protocol, for example, TCP/IP, X.25, etc.

For simplicity of illustration, subscribers 920–923 are assumed to generate incoming messages into the IN system via $IP_i$ 911. Subscribers 930–932 are assumed to be intended recipients (or termination points) for various calls and non-call-related store-and-forward messaging services within the IN system. The services, features and call restrictions that have been selected by each subscriber are stored in the SCP 901 in the form of subscriber-specific Service Logic Programs 902. The Service Scripts may include restrictions on incoming or outgoing calls, create virtual private networks and set access limitations concerning these VPNs for various call-related situations.

FIG. 9 also shows the Intelligent Network system connected through gateway IPs $IP_{gis}$ 912 and $IP_{gm}$ 914 to an exemplary Integrated Services Digital Network (ISDN) system 960 and a Public Land Mobile Network (PLMN) system 950 respectively. The illustration of FIG. 9 is exemplary and the IN system could also be connected to other public or private networks through appropriate gateway IPs, which are not shown in the figure. Although subscribers 920–923 and 930–932 are shown directly connected to $IP_i$ 911 and $IP_o$ 913 in FIG. 9, it should be emphasized that these subscribers could just as well been connected to IPs 911 and 913 through Local Exchanges and/or Switching Centers.

FIG. 9 also provides an overview of the operation of an embodiment of the present invention. When, e.g., a subscriber 920 sends a message to the incoming $IP_i$ 911, $IP_i$ 911 interrogates the SCP 901, as shown by arrow 941 to check whether any IN services such as restriction control and number translation have been requested, selected or ordered by either the sending party or the receiving party. In response the SCP 901 acknowledges the interrogation and returns the generated results to $IP_i$ 911 at 942.

In an alternative embodiment of the present invention, when $IP_o$ 913, one of the IPs handling outgoing calls and messages receives a request to send an outgoing message, it interrogates the SCP 901 as shown at 945 to check whether any IN services such as restriction control and number translation have been requested, selected or ordered by either the sending party or the receiving party. In response, the SCP 901 acknowledges the interrogation and returns the generated results to $IP_o$ 913 for further processing as shown at 946, optionally by retrieving and analyzing the Service Script 902 corresponding to either the originating or the terminating party.

An IN subscriber may subscribe to several non-call-related store-and-forward services, such as voice mail, e-mail, SMS, etc., and may wish to have the generation, storage, retransmission and delivery of these various message types to be coordinated. The various messages relating to different services subscribed to are usually stored at different physical or logical IPs in the IN network.

While it is known to restrict the generation, storage, retransmission or delivery of one or more of these message types, such measures have hitherto been message-type specific and have not been generalizable to other message types or to call service profiles or preferences. Presently, effective methods or techniques which permit different types of messages that are received at different nodes to be stored, retransmitted or delivered in a distributed manner, and based upon subscriber-specified restrictions and preferences are generally unavailable.

An embodiment of the present invention provides a solution for conforming the service profiles for non-call-related store-and-forward messages to those applicable to calls in an IN system so that a subscriber can choose to have some or all of their incoming and outgoing messages treated in the same manner as their incoming and outgoing calls.

An embodiment of the present invention does this by introducing new procedures to the NIP-INAP: the "Incoming Delivery Interrogation" command which enables an IP that receives an incoming message to query the SCF about the rights and restrictions applicable to calls made to or by the recipient of the message; and the "Outgoing Delivery Interrogation" command which enables an IP that receives a request to send an outgoing message to query the SCF about the rights and restrictions applicable to calls made to or by the author of the message.

Presently, effective manners by which to provide integrated messaging services that are implemented on different physical nodes are unavailable. An embodiment of the present invention provides a networked solution based on the IN architecture by defining a protocol to implement unified non-call-related store-and-forward messaging solutions.

Extensions to NIP-INAP Procedures

We will next consider the detailed operation of the various new procedures that are introduced to the NIP-INAP for the implementation of an embodiment of the present invention. Before an SCP can order an IP to conform the handling of a non-call-related store-and-forward message to the parameters applying to calls between the originating and the terminating parties, procedures are necessary to facilitate the interrogation of the SCP by IPs handling incoming and outgoing messages.

The "Incoming Delivery Interrogation" Message

The interrogation of the SCP by an IP handling incoming messages to test access restriction controls on calls placed by the originating or terminating parties is implemented by using the "Incoming Delivery Interrogation" command. The communications between the SCP and the Incoming and Outgoing IPs 911 and 913 is shown using Transaction Capabilities Application Part (TCAP) notation in FIGS. 10 and 11, with the message type being shown above the arrow and the components of the TCAP message and the parameters being shown beneath each arrow.

Figure 10:
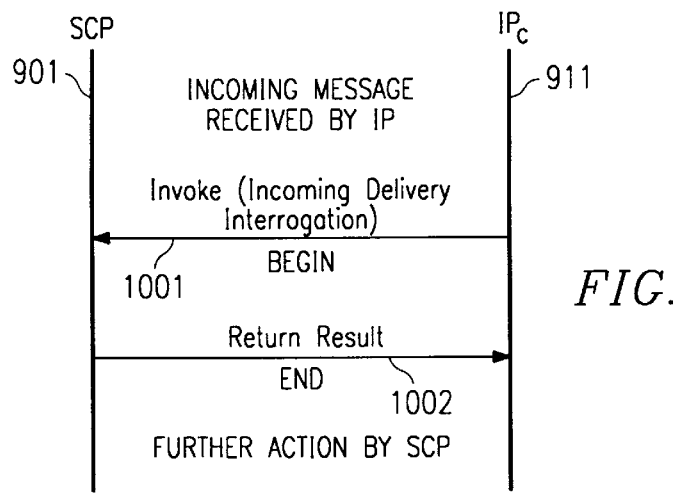
FIG. 10 is a sequence diagram illustrating the interaction between the SCP and the Incoming IP during the operation of the "Incoming Delivery Interrogation" command.

As shown at 1001 in FIG. 10, the Incoming Delivery Interrogation is sent by an Incoming IP, $IP_i$ 911 to the SCP 901 upon receiving an incoming message and prior to any storage or delivery of the message. In response, the SCP 901 queries the subscriber's Service Script 902 and returns the generated results to $IP_i$ 911 as shown at 1002. After receipt of the results by $IP_i$ 911, further action is at the discretion of the Incoming IP 911.

The "Outgoing Delivery Interrogation" Message

In contrast to the "Incoming Delivery Interrogation" message, which is spontaneously generated by the IP handling incoming non-call-related messages, the "Outgoing Delivery Interrogation" message is generated when the IP handling outgoing non-call-related messages receives a request to send an outgoing message for delivery.

Figure 11:
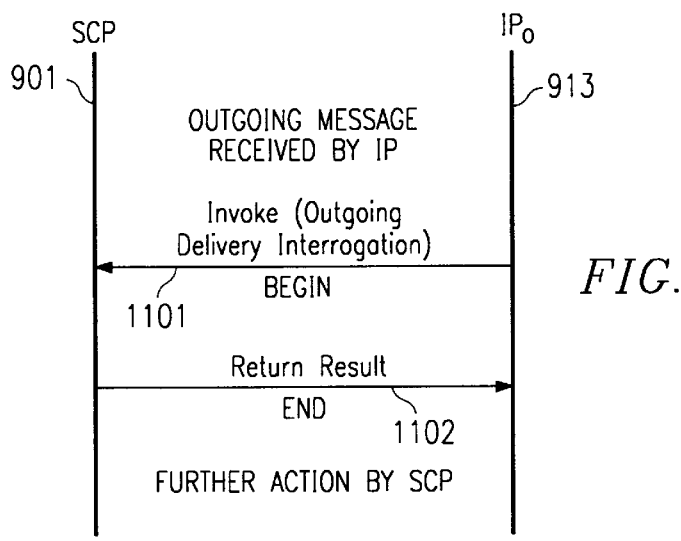
FIG. 11 is a sequence diagram illustrating the interaction between the SCP and the Outgoing IP during the operation of the "Outgoing Delivery Interrogation" command.

FIG. 11 shows the sequence diagram when the Outgoing IP, $IP_o$ 913, queries the SCP 901 about access restrictions on calls placed by the originating and/or terminating parties. As shown at 1101, the Outgoing Delivery Interrogation is sent by an Outgoing IP, $IP_o$ 913 to the SCP 901 upon receiving a request to send an outgoing message and prior to any storage or delivery of the message. In response, the SCP 901 queries the subscriber's Service Script 902 and returns the generated results to $IP_o$ 913 as shown at 1102. After receipt of the results by $IP_o$ 913, further action is at the discretion of the Outgoing IP 913.

The present invention permits the uniform treatment of messages and calls by introducing the new procedures: the "Incoming Delivery Interrogation" command which enables an IP dealing with incoming message to query the recipient's call-related service profile and service logic for handling the incoming message; and the "Outgoing Delivery Interrogation" command which enables an IP dealing with outgoing messages to query the author's call-related service profile and service logic for handling the outgoing message.

In the sequence diagrams discussed above, a specific IP referred to as the Incoming IP, $IP_i$ 911 is used for handling all incoming messages. Similarly, a specific IP, called the Outgoing IP, $IP_o$ 913 is used to handle outgoing messages. However, it should be emphasized that the actions can take place either at the identified Incoming or Outgoing IPs, at any IP supporting the desired medium, or at any one or more IPs possessing the necessary processing power and system resources.

The above-described system and method enables an IN system to treat calls and non-call-related messages in an uniform manner. This is made possible by the creation of new procedures to query each subscriber's centrally stored preferences and rights regarding the handling of calls. An additional advantage of an embodiment the present invention is that it permits a subscriber to interactively prescribe the handling of a specific message or to modify a handling preference prescribed earlier.

SCP and IP Finite State Machines

FIGS. 12–15 show the finite state machines for the SCP 901 and the various IPs such as $IP_i$ 911 and $IP_o$ 913 that handle incoming and outgoing non-call-related store-and-forward messaging services of an embodiment of the present invention. In FIGS. 12–15, the states of the machine are symbolized with an oval, while events causing state transitions are drawn as continuous arrows. Functions are depicted within broken rectangles, while actions ordered by the functions are indicated by broken arrows.

Figure 12:
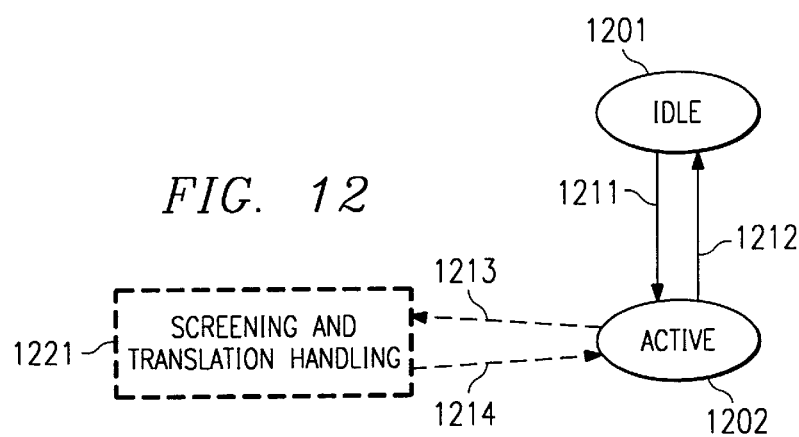
FIG. 12 shows the finite state machine for the SCP during the processing of incoming non-call-related messages of the present invention.

FIG. 12 shows the finite state machine for the SCP 901 during the processing of incoming non-call-related messages. As can be seen, the SCP has two states: the Idle state 1201 and the Active state 1202. The SCP 901 also has an additional quasi-state: the Screening and Translation Handling state 1221.

The SCP goes from the Idle state 1201 to the Active state 1202 upon the receipt of the "Incoming Delivery Interrogation" command from $IP_i$ 911, as shown at 1211. The SCP goes from the Active state 1202 to the Idle state 1201 as shown at 1212 upon the normal termination of the dialogue between the SCP and the invoking IP, upon the rejection of a dialogue due to the presence of improper components or if a dialogue is aborted from either side. It should be noted that in an IN system, the receiving party never times out a dialog. Only the invoking party (i.e. the SCP or the IP that initiates the dialog) can time out a dialog.

Upon the invocation of the "Incoming Delivery Interrogation" command by $IP_i$ 911, the transition from the Idle state 1201 to the Active state 1202 is additionally accompanied by the execution of the auxiliary conforming service for the non-call-related message such as verification of a call restriction or translation of a personal (short) number to a standard/global number, as shown at 1213 and the subsequent return of the results of the auxiliary process as shown at 1214.

Figure 13:
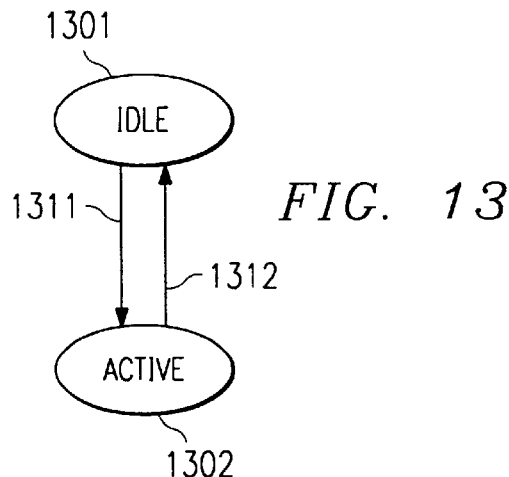
FIG. 13 shows the finite state machine for the IP during the processing of incoming non-call-related messages of the present invention.

FIG. 13 shows the finite state machine from the $IP_i$ side during the processing of incoming non-call-related messages. Each $IP_i$ 911 has two principal states: the Idle state 1301 and the Active state 1302.

As shown in FIG. 13, an $IP_i$ 911 goes from Idle state 1301 to the Active state 1302 upon invoking the "Incoming Delivery Interrogation" command as shown at 1311. The reverse state transition, from the Active state 1302 to the Idle state 1301 as shown at 1312 occurs upon normal termination of the dialogue with the SCP 901, upon rejection of an offered result by the SCP due to the presence of improper components, upon an abort of the SCP-$IP_i$ dialogue from either side or upon the operation being timed out.

Figure 14:
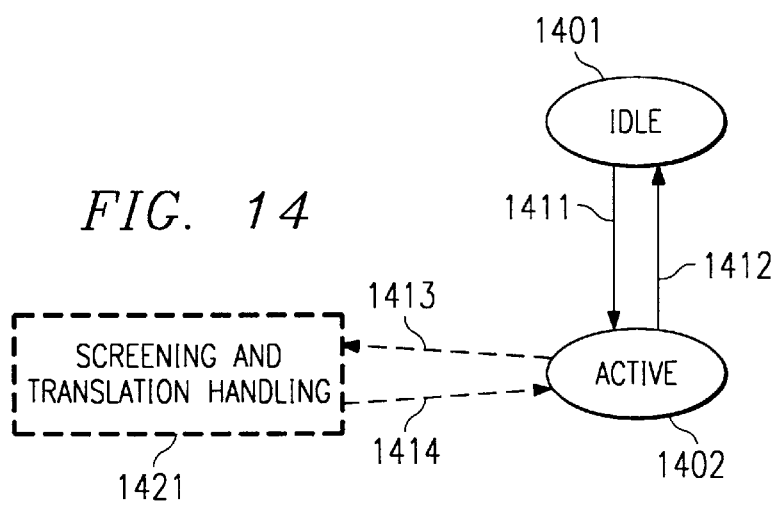
FIG. 14 shows the finite state machine for the SCP during the processing of outgoing non-call-related messages of the present invention.

FIG. 14 shows the finite state machine for the SCP during the processing of outgoing non-call-related messages. As can be seen, the SCP has two states: the Idle state 1401 and the Active state 1402. There is also an additional quasistate: the Screening and Translation Handling state 1421.

The SCP goes from the Idle state 1401 to the Active state 1402 upon the receipt of the "Outgoing Delivery Interrogation" command to $IP_i$ 911, as shown at 1411. The SCP goes from the Active state 1402 to the Idle state 1401 as shown at 1414 upon normal termination of the dialogue between the SCP and the IPs, if a dialogue were rejected due to the presence of improper components or if a dialogue is aborted from either side.

Upon the invocation of the "Outgoing Delivery Interrogation" command by $IP_i$ 911, the transition from the Idle state 1401 to the Active state 1402 is additionally accompanied by the execution of the auxiliary conforming service for the non-call-related message such as verification of a call restriction or translation of a personal (short) number to a standard/global number, as shown at 1413 and the subsequent return of the results of the auxiliary process as shown at 1414.

Figure 15:
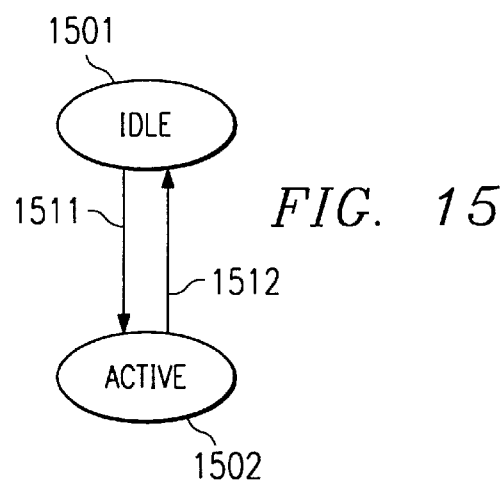
FIG. 15 shows the finite state machine for the IP during the processing of outgoing non-call-related messages of the present invention.

FIG. 15 shows the finite state machine from the $IP_i$ side during the processing of outgoing non-call-related messages. Each $IP_i$ 911 has two principal states: the Idle state 1501 and the Active state 1502.

As shown in FIG. 15, an $IP_i$ 911 goes from Idle state 1501 to the Active state 1502 upon invoking the "Outgoing Delivery Interrogation" command as shown at 1511. The reverse state transition, from the Active state 1502 to the Idle state 1501 as shown at 1512 upon normal termination of the dialogue with the SCP 901, upon rejection of an offered result by the SCP due to the presence of improper components, upon an abort of the SCP-$IP_i$ dialogue from either side or upon the operation being timed out.

As described previously, in an embodiment of the present invention virtual private networks (VPNs), are created, such as at the service script 902, shown in FIG. 9. A standard feature of a typical VPN is the capability of the VPN to have User Groups (UGs). Such groups, depending upon system requirements, are typically, logically-independent groups having their own capabilities, charging, number plan. In a VPN, users/subscribers have the capability—amongst others—to use short extension numbers to reach other users in their own group or within the corporation. In other words, the subscribers do not have to dial the complete number but the extension number and service will do that translation for them.

Similarly Closed User Groups (CUGs) are User Groups with more traffic limitations, i.e., members of a CUG are only allowed to make and receive call to/from members of the same group or members belonging to the Open User Group.

Users are sometimes able to circumvent this CUG restriction for instance by recording a voice message and sending it to the receiver's destination. To restrict these type of "back-end" methods, an embodiment of the invention gives a method to do incoming and outgoing interrogation for Store and Forward Services. This method may be extended to cover call-related services also.

Additionally, the present methods described above provide a number interrogation and translation mechanism for store and forward services so that users can utilize the same numbering plan/extension numbers while addressing other users when using these store and forward services.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. In an IN (Intelligent Network) telecommunications system comprising a plurality of IPs (Intelligent Peripherals) connected to an SCP (Service Control Point) over a network, a method for constructing a service profile applicable to an incoming non-call-related store-and-forward IN message which is analogous to a service profile applicable to incoming calls in an IN system, said method comprising the steps of:

receiving said incoming message from an originating party for a terminating party at an Incoming IP;

determining and analyzing said service profile applicable to incoming calls which has been selected by, or imposed upon, either said originating party or said terminating party to be applied to said incoming message;

constructing said service profile applicable to said incoming message in response to the determination and analysis of said service profile applicable to incoming calls;

applying said constructed service profile applicable to said incoming message;

returning the results of said step of applying to said Incoming IP; and delegating control of further processing of said incoming message to said Incoming IP.

2. The method of claim 1, wherein said step of constructing said service profile applicable to said incoming message additionally comprises the step of interrogating the SCP.

3. The method of claim 1, wherein said step of applying said constructed service profile applicable to said incoming message additionally includes the step of retrieving and analyzing a service script stored in said SCP that corresponds to either the originating party or the terminating party, said stored service script containing user-specific call and message-handling preferences.

4. The method of claim 1, wherein said step of determining and analyzing is performed using an INCOMING DELIVERY INTERROGATION command.

5. In an IN (Intelligent Network) telecommunications system comprising a plurality of IPs (Intelligent Peripherals) connected to an SCP (Service Control Point) over a network, a method for constructing a service profile applicable to an outgoing non-call-related store-and-forward IN message which is analogous to a service profile applicable to outgoing calls in an IN system, said method comprising the steps of:

receiving a request to send said outgoing message from an originating party to a terminating party at an Outgoing IP;

determining and analyzing said service profile applicable to outgoing calls which has been selected by, or imposed upon, either said originating party or said terminating party to be applied to said outgoing message;

constructing said service profile applicable to said outgoing message in response to the determination and analysis is of said service profile applicable to outgoing calls;

applying said constructed service profile applicable to said outgoing message;

returning the results of said step of applying to said Outgoing IP; and delegating control of further processing of said outgoing message to said Outgoing IP.

6. The method of claim 5, wherein said step of constructing said service profile applicable to said outgoing message additionally comprises the step of interrogating the SCP.

7. The method of claim 5, wherein said step of applying said constructed service profile applicable to said outgoing message additionally includes the step of retrieving and analyzing a service script stored in said SCP that corresponds to either the originating party or the terminating party, said stored service script containing user-specific call and message-handling preferences.

8. The method of claim 5, wherein said step of determining and analyzing is performed using an OUTGOING DELIVERY INTERROGATION command.

9. In an IN (Intelligent Network) telecommunications system comprising a plurality of IPs (Intelligent Peripherals) connected to an SCP (Service Control Point) over a network, a system for constructing a service profile applicable to an incoming non-call-related store-and-forward IN message which is analogous to a service profile applicable to incoming calls in an IN system, said system comprising:

means for receiving said incoming message from an originating party for a terminating party at an Incoming IP;

means for determining and analyzing said service profile applicable to incoming calls which has been selected by, or imposed upon, either said originating party or said terminating party to be applied to said incoming message;

means for constructing said service profile applicable to said incoming message in response to the determination and analysis of said service profile applicable to incoming calls;

means for applying said constructed service profile applicable to said incoming message;

means for returning the results of applying said constructed service profile to said incoming message to said Incoming IP; and means for delegating control of further processing of said incoming message to said Incoming IP.

10. The system of claim 9, wherein said means for constructing said service profile applicable to said incoming message additionally comprises means for interrogating the SCP.

11. The system of claim 9, wherein said means for applying said constructed service profile applicable to said incoming message additionally includes means for retrieving and analyzing a service script stored in said SCP that corresponds to either the originating party or the terminating party, said stored service script containing user-specific call and message-handling preferences.

12. The system of claim 9, wherein said means for determining and analyzing additionally comprises an INCOMING DELIVERY INTERROGATION command.

13. In an IN (Intelligent Network) telecommunications system comprising a plurality of IPs (Intelligent Peripherals) connected to an SCP (Service Control Point) over a network, a system for constructing a service profile applicable to an outgoing non-call-related store-and-forward IN message which is analogous to a service profile applicable to outgoing calls in an IN system, said system comprising:

means for receiving at least a request to send said outgoing message from an originating party to a terminating party at an Outgoing IP;

means for determining and analyzing said service profile applicable to outgoing calls which has been selected by, or imposed upon, either said originating party or said terminating party to be applied to said outgoing message;

means for constructing said service profile applicable to said outgoing message in response to the determination and analysis of said service profile applicable to outgoing calls;

means for applying said constructed service profile applicable to said outgoing message;

means for returning the results of applying said constructed service profile applicable to said outgoing message to said Outgoing IP; and means for delegating control of further processing of said outgoing message to said Outgoing IP.

14. The system of claim 13, wherein said means for constructing said service profile applicable to said outgoing message additionally comprises means for interrogating the SCP.

15. The system of claim 13, wherein said means for applying said constructed service profile applicable to said outgoing message additionally includes means for retrieving and analyzing a service script stored in said SCP that corresponds to either the originating party or the terminating party, said stored service script containing user-specific call and message-handling preferences.

16. The system of claim 13, wherein said means for determining and analyzing additionally comprises an OUTGOING DELIVERY INTERROGATION command.

17. In a method for providing call-related services between an originating party and terminating party by way of an IN (Intelligent Network) telecommunications system, the call-related services provided pursuant to a service profile applicable to at least one of the originating and terminating parties, respectively, the IN telecommunications system further permitting non-call-related, store-and-forward services, an improvement of a method for communicating a non-call-related, store-and-forward IN message between the originating and terminating parties in a manner in conformance with a corresponding service profile applicable to the at least one of the originating and terminating parties, said method comprising the steps of:

detecting reception of the non-call-related, store-and-forward IN message at an IP (Intelligent Peripheral) of the IN telecommunications system generated by the originating party;

determining the service profile applicable to the at least one of the originating and terminating parties;

constructing a set of IN services applicable to the non-call-related,-store-and-forward IN message to be communicated between the originating and terminating parties, the set corresponding to the service profile applicable to the at least one of the originating and terminating parties;

applying the set of IN services constructed during said set of constructing to the non-call-related, store-and-forward IN message; and forwarding the non-call-related, store-and-forward IN message, if permitted pursuant to the set of IN services, to the terminating party pursuant to the set of IN services.

18. In a system for providing call-related services between an originating party and terminating party by way of an IN (Intelligent Network) telecommunications system, the call-related services provided pursuant to a service profile applicable to at least one of the originating and terminating parties, respectively, the IN telecommunications system further permitting non-call-related, store-and-forward services, an improvement of an apparatus for communicating a non-call-related, store-and-forward IN message between the originating and terminating parties in a manner in conformance with a corresponding service profile applicable to the at least one of the originating and terminating parties, said apparatus comprising the steps of:

an IP (Intelligent Peripheral) coupled to receive the non-call-related, store-and-forward IN message from the originating party;

a SCP (Service Control Point) coupled to said IP and operative at least responsive to reception at said IP of the non-call-related, store-and-forward, IN message, said SCP having a service script at which the service profile applicable to the at least one of the originating and terminating parties is located, said SCP for constructing a set of IN services applicable to the non-call-related,-store-and-forward IN message to be communicated between the originating and terminating parties, the set corresponding to the service profile applicable to the at least one of the originating and terminating parties; and wherein said IP applies the set of IN services constructed by said SCP and forwards the non-call-related, store-and-forward, IN message, if permitted, to the terminating party pursuant to the set of IN services.

* * * * *